(12) United States Patent
Ichikawa et al.

(10) Patent No.: US 9,716,262 B2
(45) Date of Patent: Jul. 25, 2017

(54) BATTERY WIRING MODULE MANUFACTURING METHOD

(71) Applicant: Yazaki Corporation, Tokyo (JP)

(72) Inventors: Yoshiaki Ichikawa, Kakegawa (JP); Hirotaka Mukasa, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 84 days.

(21) Appl. No.: 14/967,503

(22) Filed: Dec. 14, 2015

(65) Prior Publication Data
US 2016/0172650 A1    Jun. 16, 2016

(30) Foreign Application Priority Data

Dec. 15, 2014    (JP) .................................. 2014-253434

(51) Int. Cl.
*H01M 2/20* (2006.01)
*H01M 10/48* (2006.01)

(52) U.S. Cl.
CPC ......... *H01M 2/206* (2013.01); *H01M 10/482* (2013.01); *H01M 2220/20* (2013.01)

(58) Field of Classification Search
CPC . H01M 2/206; H01M 2220/20; H01M 10/482
See application file for complete search history.

(56) References Cited

U.S. PATENT DOCUMENTS

| 2013/0000957 A1 | 1/2013 | Ikeda et al. |
| 2015/0214534 A1* | 7/2015 | Callicoat .............. B23K 1/0016 429/121 |

FOREIGN PATENT DOCUMENTS

| JP | 2010-114025 A | 5/2010 |
| JP | 201118473 A | 1/2011 |
| JP | 2011228217 A | 11/2011 |
| JP | 2012190678 A | 10/2012 |
| JP | 2012243647 A | 12/2012 |

OTHER PUBLICATIONS

Office Action issued on Jan. 4, 2017, by the Japanese Patent Office in counterpart Japanese Application No. 2014-253434.

* cited by examiner

*Primary Examiner* — Mark F Huff
*Assistant Examiner* — Monique Wills
(74) *Attorney, Agent, or Firm* — Sughrue Mion, PLLC (57) ABSTRACT

A battery wiring module is manufactured by an arrangement process of arranging in parallel a long chain bus-bar which is configured by connecting a plurality of bus bars at chain parts, a covering process of covering both an outer periphery of plurality of linear conductors and a side edge of the chain bus-bar adjacent to the plurality of linear conductors with an insulation resin part integrally formed by extrusion molding, a breaking process of breaking the chain parts of the chain bus-bar in order to separate the plurality of bus bars, and a connection process of electrically connecting each of the plurality of linear conductors to a predetermined one of the bus bars.

6 Claims, 11 Drawing Sheets

BATTERY WIRING MODULE MANUFACTURING METHOD

CROSS REFERENCE TO RELATED APPLICATIONS

This application claims priority from Japanese Patent Application No. 2014-253434 filed on Dec. 15, 2014, the entire contents of which are incorporated herein by reference.

BACKGROUND OF THE INVENTION

Field of the Invention

The present invention relates to a manufacturing method for a battery wiring module.

Related Art

In an in-vehicle battery pack to be connected to a power converter for driving a motor in a vehicle such as a hybrid car or an electric car, a battery module is configured that many battery cells are stacked in a manner of being alternatively reversed so that a positive electrode terminal and a negative electrode terminal are adjoined between the adjacent battery cells. Then, the electrode terminals of the adjacent battery cells are connected by a connection member such as a bus bar or the like, and thus a plurality of the battery cells are connected in series or in parallel.

In a case of assembling the battery module of the aforesaid configuration, it is necessary to connect between the electrode terminals via the respective connection members at plural portions. In view of this, a bus bar module is employed. The bus bar module is formed in a manner that a plurality of the connection members, arranged within a die according to the number of spaces among the electrode terminals to be connected, are integrally molded within insulation resin using an insert molding or the like.

In a case of connecting a plurality of the battery cells in series or in parallel, if battery characteristic such as a battery voltage is not uniform among the battery cells, degradation or breakage of the battery may be caused. Thus, in the in-vehicle battery pack, in order to stop charging or discharging before an abnormality occurs in a voltage between the respective battery cells, each of the bus bars is provided with a voltage detection wire for detecting a voltage of the corresponding battery cell.

In a bus bar module of a related art, the voltage detection wire adopts a configuration that a tip of a covered wire is peeled to expose a core wire, then a round terminal is crimped to the core wire, then the round terminal is fitted to an electrode terminal of a battery cell, and the round terminal is jointly fastened to the electrode terminal together with the connection member by a nut.

However, such the bus bar module has a problem that if the number of the voltage detection wires is large, an entire thickness of these wires becomes large and hence these wires are less likely bent. Also, as these wires are heavy as a whole, a wiring work of these wires becomes difficult. Further, the bus bar serving as the connection member is fitted to the positive and negative electrode terminals protruded from the battery cell. Also the round terminal crimped to the voltage detection wire is fitted to the electrode terminal and is jointly fastened to the electrode terminal together with the connection member by a nut. Thus, there arises a problem that a resistance value of a contact face between the bus bar and the round terminal becomes large to thereby cause a voltage drop therebetween.

In view of this, there has been proposed a high-voltage detection module device (bus bar module) for a battery pack which can easily wire to respective battery cells with a simple structure, and cause no voltage drop (for example, see a patent literature 1).

In this high-voltage detection module device for the battery pack, a plurality of bus bars are arranged at an insulation frame body combined with a battery pack body in a state of connecting prescribed positive and negative electrode terminals of the battery cell, then a flat cable is disposed in a region of the insulation frame body except this arrangement region, and conductive wires, separated by making notches in a specified shape between the respective conductive wires of this flat cable while leaving roots, are welded to the predetermined bus bars, respectively.

As the high-voltage detection module device for the battery pack thus configured is constituted of the insulation frame body, the plurality of bus bars and the flat cable, this device can be configured by a simple structure. Further, the high-voltage detection module device can be configured by simple works of arranging the bus bars at the insulation frame body, separating the respective conductive wires from the flat cable, and welding the conductive wires to the respective bus bars.

PRIOR ART LITERATURE

Patent Literature

[Patent Literature 1] JP-A-2010-114025

However, the insulation frame body of the high-voltage detection module device of the patent literature 1 has a rectangular plate shape in a plan view, and is configured to have a plurality of protrusions arranged on a lower surface thereof at a predetermined interval, and a plurality of through holes opened at a predetermined interval at the plate-shaped part. That is, each of the predetermined space and the number of the plurality of protrusions to be fitted into gaps among the respective battery cells is required to be changed depending on a size of the battery cell. Further, each of the predetermined interval and the number of the plurality of through holes opened at the same interval as that between the positive and negative electrode terminals of the battery cell is required to be changed depending on the size of the battery cell. Thus, the insulation frame body is a dedicated component for every kinds of the battery pack. As a result, this high-voltage detection module device has a low versatility and hence reduction of a manufacturing cost thereof is difficult.

SUMMARY OF THE INVENTION

One or more embodiments of the invention provide a manufacturing method for a battery wiring module which can easily perform wiring to respective battery cells with simple configuration, and also can improve versatility and reduce a manufacturing cost.

In an aspect (1), one or more embodiments provide a manufacturing method for a battery wiring module which is combined with a battery module including a plurality of battery cells stacked in a state of being alternatively reversed so that a positive electrode terminal and a negative electrode terminal are adjoined between the adjacent battery cells. According to the manufacturing method, the battery wiring module is manufactured by:

an arrangement process of arranging in parallel a long chain bus-bar which is configured by connecting a plurality of bus bars at chain parts, along to at least one side of a plurality of linear conductors which are arranged in parallel at a predetermined interval;

a covering process of covering both an outer periphery of the plurality of linear conductors and a side edge of the chain bus-bar adjacent to the plurality of linear conductors with an insulation resin part integrally formed by extrusion molding;

a breaking process of, after the covering process, breaking the chain parts of the chain bus-bar in order to separate the plurality of bus bars in which each of the bus bars is electrically connecting the positive electrode terminal and the negative electrode terminal adjacent to each other; and a connection process of electrically connecting each of the plurality of linear conductors to a predetermined one of the bus bars.

According to the aspect (1), in the covering process, both the outer periphery of the plurality of linear conductors and the side edge of the long chain bus-bar are covered by the insulation resin part integrally formed by the extrusion molding. Thus, a long chain circuit body, in which the plurality of linear conductors and the chain bus-bar are integrally arranged in parallel, is formed. As the bus bars of this chain circuit body are formed in a continuous fashion by the extrusion molding, a manufacturing cost can be reduced easily.

Then, in the breaking process, the plurality of chain parts formed at the predetermined interval along the longitudinal direction of the chain circuit body are broken. Thus, the plurality of bus bars connected via the insulation resin part are integrally arranged along the plurality of linear conductors. By doing so, the bus bars, which interval is set to a predetermined value depending on the battery cell, can be easily formed.

Various kinds of the chain bus-bar, in which the bus bars are coupled via the chain parts at difference intervals according to respective spaces between the positive and negative electrode terminals, can be prepared. In the covering process, desired one of these various kinds of the chain bus-bar can be selectively used. By doing so, the bus bars, which interval is suitably changed depending on a size or the like of the battery cell, can be easily formed. As a result, the battery wiring module of a quite high versatility can be obtained.

Further, as the plurality of bus bars are integrally arranged along the linear conductors via the insulation resin part, mounting workability at a time of assembling the battery wiring module with the battery module can be prevented from being degraded. Of course, it is not necessary to separately prepare a member for arranging the plurality of bus bars on the battery module.

In addition, the long chain bus-bar is constituted of the chain parts arranged at the predetermined interval, and each of the chain parts is formed in a manner that a width in the longitudinal direction of the chain bus-bar is sufficiently smaller than a width in a direction perpendicular to this longitudinal direction. Thus, when the chain circuit body after the covering process is wound around a winding center in the direction perpendicular to the longitudinal direction, the chain part having a small sectional area of the chain bus-bar deforms easily. Thus, the chain circuit body can be wound around a winding reel or the like as a wound member having a small diameter. As a result, the chain circuit body after the covering process can be wound to have a small diameter. Accordingly, a wound chain circuit body obtained by winding the chain circuit body can be facilitated in its transportation and treatment and improved in its productivity.

Incidentally, the wound chain circuit body is wound around the winding reel spirally within a range not remaining permanent distortion in the bus bars. However, permanent distortion may be caused in the chain parts. As the chain parts are removed in the breaking process, even if distortion is caused in the chain parts, such the distortion does not influence on reliability of contact with the positive and negative electrode terminals.

In an aspect (2), terminal through holes for inserting the positive electrode terminals or the negative electrode terminals may be formed in the chain bus-bar in advance of the covering process.

According to the aspect (2), the terminal through holes are formed in the bus bars of the chain bus-bar in advance. The bus bar has a reduced sectional area at a portion provided with the terminal through hole. The bus bar having the terminal through hole is lower in its rigidity as compared with the bus bar having no terminal through hole. The chain bus-bar likely deforms elastically due to the reduction of rigidity at the terminal through hole portion in addition to the flexibility due to the chain part. Thus, the chain circuit body after the covering process, equipped with the chain bus-bar having the terminal through holes, can be wound with a smaller diameter.

Further, in a case of using the chain bus-bar in which the terminal through holes are formed in advance, the breaking process can be completed only by cutting the chain parts. Accordingly, as a processing of forming the terminal through holes in the breaking process can be eliminated, a cost of a post processing can be reduced.

In an aspect (3), the chain parts may be formed at the side edge of the chain bus-bar.

According to the aspect (3), the chain parts are formed at the side edge of the chain bus-bar. The chain parts arranged at the side edge are covered by the insulation resin part in the covering process. The chain parts are broken together with the insulation resin part in the breaking process. Thus the bus bar does not have any remarkable cut mark (burr or the like) of the chain parts at a contour thereof in a plan view. As a result, appearance of the bus bar can be improved.

In an aspect (4), each of the chain parts may be formed at a center position of the chain bus-bar in a direction perpendicular to a longitudinal direction of the chain bus-bar.

According to the aspect (4), the chain parts are not covered by the insulation resin part in the covering process. In the breaking process, only the chain parts are broken but the insulation resin part is not broken. Thus, as notch loss does not occur in the insulation resin part, durability of the insulation resin part can be improved. Further, in the chain bus-bar arranging the chain parts at the center position thereof, as the chain parts are not covered by the insulation resin part, presence/non-presence of the chain parts after the breaking process can be visually recognized easily.

According to the manufacturing method for the battery wiring module of one or more embodiments, wiring to the respective battery cells can be performed easily with simple configuration, and also versatility can be improved and a manufacturing cost can be reduced As described above, the invention is explained briefly. Further, details of the invention will be clarified further by thoroughly reading, with reference to accompanying drawings, modes for carrying out the invention (hereinafter referred to "embodiments") explained below.

DETAILED DESCRIPTION OF THE EMBODIMENTS

Exemplary embodiments will be explained with reference to drawings.

As shown in FIGS. 1 to 3B, a battery pack 10 configured by combining battery wiring modules 30A, 30B according to the first embodiment is used as a driving source for, for example, an electric car or a hybrid car or the like. The battery pack includes a battery module 20 having a plurality of battery cells 12 arranged in a side-by-side manner. The battery module 20 is configured in a manner that the plurality of battery cells 12 are arranged and fixed via separators therebetween within a not-shown box-shaped casing.

The battery wiring modules 30A, 30B according to the first embodiment are constituted of a plurality of bus bars 32A, 32B which connect the plurality of battery cells 12 in series, voltage detection wires 40 for measuring voltages of the respective battery cells 12, and connectors 50 connected to one ends of the respective voltage detection wires 40.

Figure 1:
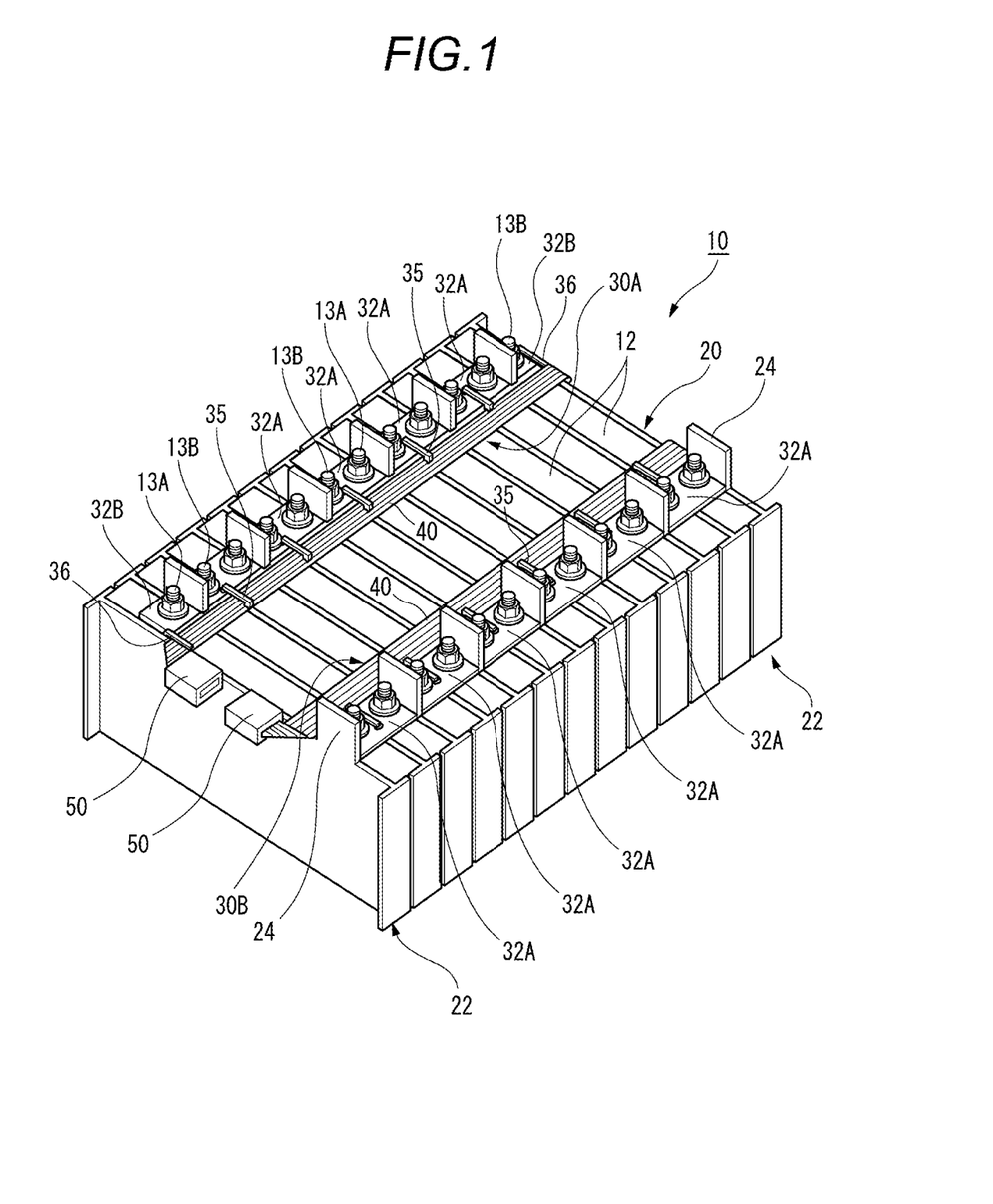
FIG. 1 is an entire perspective view of a battery pack combined with battery wiring modules according to a first embodiment.
Figure 2:
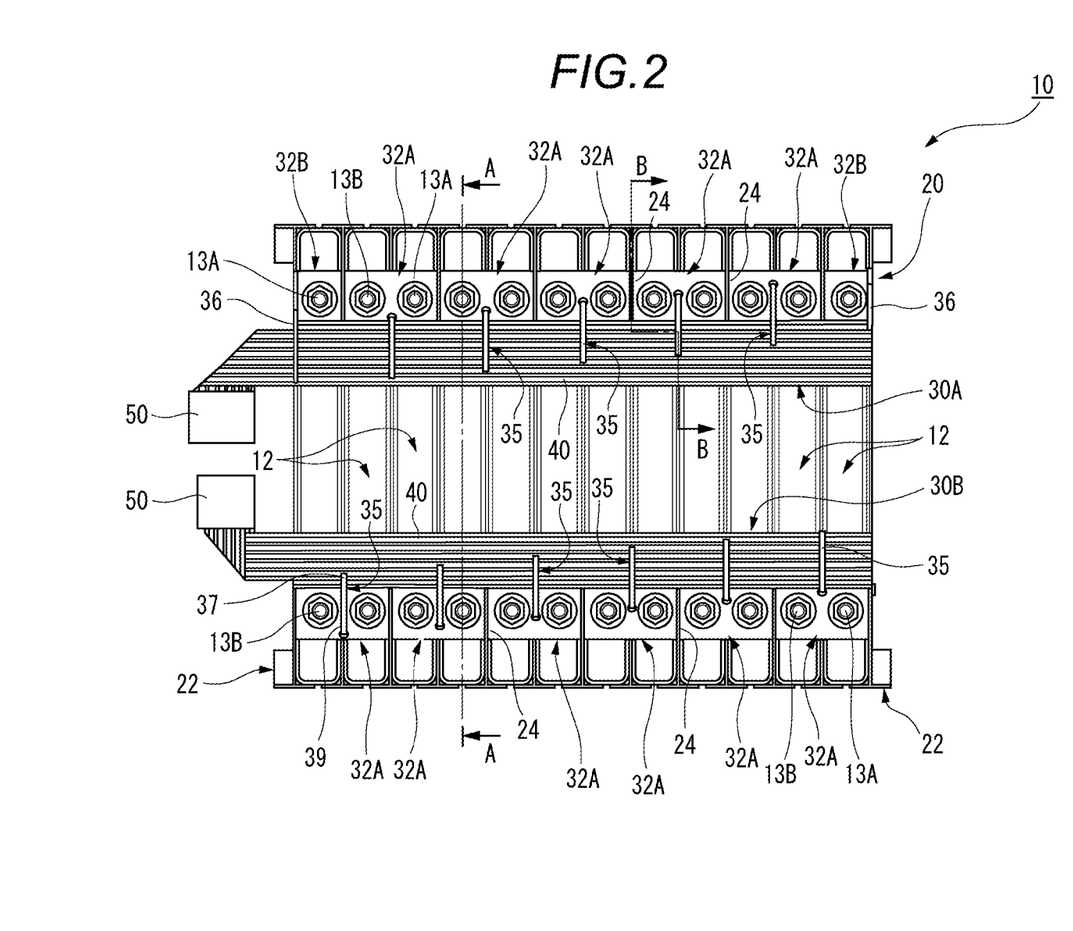
FIG. 2 is a plan view of the battery pack shown in FIG. 1.
Figure 7:
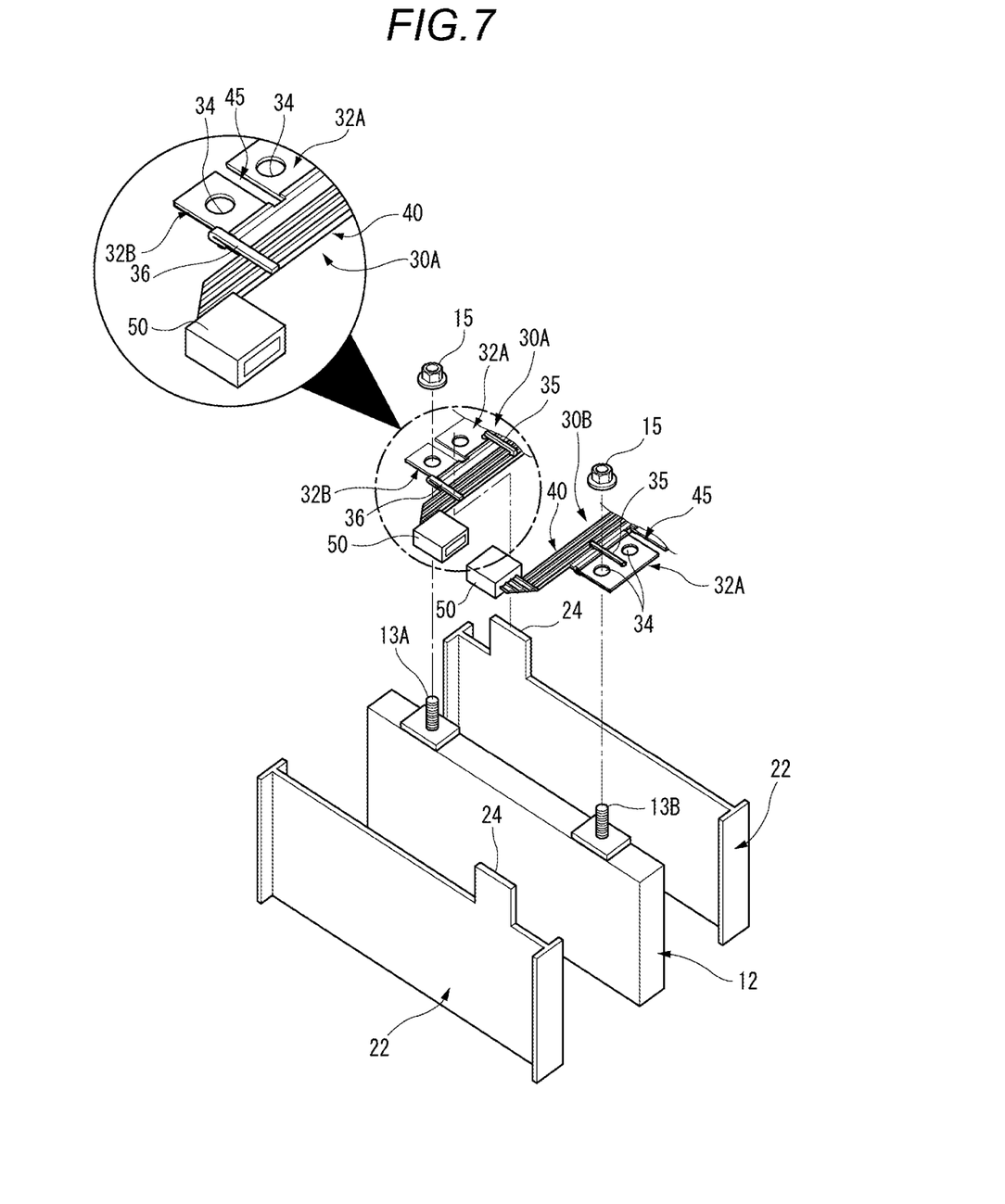
FIG. 7 is an exploded perspective view of a main part of the battery pack shown in FIG. 1.

Each of the battery cells 12 is a secondary battery, and has a positive electrode terminal 13A and a negative electrode terminal 13B each protruding from an upper surface thereof as shown in FIG. 7. In a case of disposing the battery cells within the casing, as shown in FIG. 2, the battery cells 12 are stacked in a manner of being alternatively reversed so that the positive electrode terminal 13A and the negative electrode terminal 13B are adjoined between the adjacent battery cells. These positive electrode terminal 13A and negative electrode terminal 13B of the battery cell are fastened by nuts 15 via the bus bars 32A, 32B, respectively.

Separators 22 made of insulation resin shown in FIG. 7 are disposed at both sides of each of the battery cells 12, respectively. A partition part 24 protruding upward from an upper surface of the battery cell 12 is formed at an upper end of the separator 22. The partition part 24 is disposed in a slit (space) 45 formed between the adjacent bus bars 32A, 32B, thus preventing short-circuit between the electrodes due to a tool.

As shown in FIG. 2, the battery wiring modules 30A and 30B of a belt-shape are disposed on the plurality of battery cells 12 along an arrangement direction of the battery cells 12.

The battery wiring modules 30A and 30B are disposed in two rows along the arrangement direction of the battery cells 12. In the battery wiring modules 30A and 30B, a plurality of the bus bars 32A, 32B are arranged in two rows on the positive electrode terminals 13A and the negative electrode terminals 13B that are arranged alternatively along the arrangement direction of the battery cells 12. Further, the voltage detection wires 40 are arranged in parallel on the inner sides of respective bus bar rows constituted by the bus bars 32A, 32B.

The bus bars 32A, 32B constituting each of the battery wiring modules 30A and 30B are configured that terminal through holes 34 for passing and connecting the positive electrode terminals 13A and the negative electrode terminals 13B are arranged in one row. In the rear side bus bar row among the two bus bar rows shown in FIG. 2, the bus bar 32B having a single hole constituted of the terminal through hole 34 is provided at each of both ends of this bus bar row, and the bus bar 32A having two holes constituted of the two terminal through holes 34 is provided five between the two bus bars 32B. In contrast, in the near side bus bar row among the two bus bar rows shown in FIG. 2, the bus bar 32A having two holes are provided six.

Figure 5A:
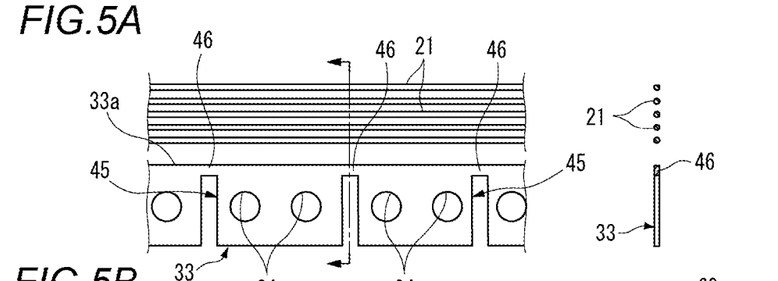
FIGS. 5A to 5D are plan views and cross sectional views of a main part of the battery wiring module shown in FIG. 1, for explaining a fabrication process of the battery wiring module.
Figure 5B:
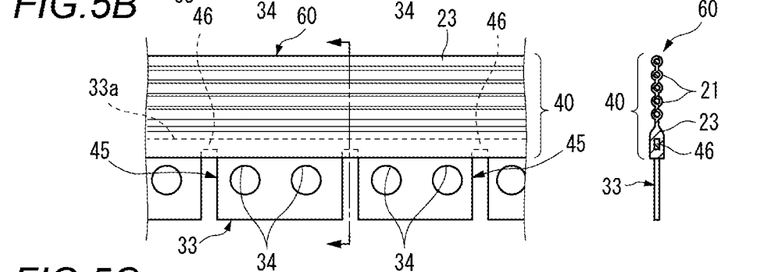
Figure 5C:
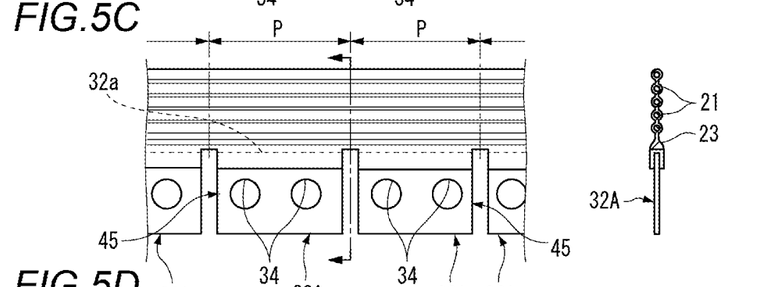

As shown in FIG. 5C, each of the bus bars 32A, 32B has an almost rectangular shape. In each of the bus bars 32A and in a pair of the bus bars 32B, the terminal through holes 34 for passing the positive electrode terminals 13A and the negative electrode terminals 13B therethrough are formed. Further, in a pair of the bus bars 32B, the terminal through holes 34 for passing the positive and negative electrode terminals 13A, 13B therethrough are formed, respectively. The bus bars 32A, 32B are formed, in a breaking process described later, by punching out chain parts 46 of a long chain bus-bar 33 which is constituted of a metal plate made of copper, copper alloy, aluminum, aluminum alloy, gold, stainless steel (SUS) or the like. Each of the bus bars 32A, 32B may be subjected to a plating treatment using Sn, Ni, Ag, Au or the like in order to improve welding property.

Incidentally, each of the bus bars 32A, 32B according to the embodiment is electrically connected to the respective terminals by screwing and fastening the nuts 15 on the positive electrode terminal 13A and the negative electrode terminal 13B passing the respective terminal through holes 34. Of course, each of the bus bars according to the invention may be electrically connected to the positive and negative electrode terminals by being welded to the respective terminals, without forming the terminal through holes 34.

The voltage detection wire 40 constituting each of the battery wiring modules 30A and 30B is formed in a manner that, in a covering process described later, an outer periphery of a plurality of linear conductors 21 arranged in parallel with a predetermined space is covered by an insulation resin part 23 (for example, insulation resin such as polypropylene (PP), polyvinyl chloride (PVC), polybutylene terephthalate (PBT), polyethylene terephthalate (PET)) integrally formed by extrusion molding and thus formed in a flat cable shape. As the linear conductor according to the invention, various kinds of conductors such as a single wire of a flat conductor or a round conductor or a twisted wire may be used.

Incidentally, in the battery wiring modules 30A, 30B according to the first embodiment, a side edge 32a adjacent to the linear conductors 21 in each of the bus bars 32A, 32B is covered by the insulation resin part 23 integrally formed by the extrusion molding. Thus, the plurality of the bus bars 32A, 32B, which side edges 32a adjacent to the linear conductors 21 via the insulation resin part 23 are connected to the voltage detection wire 40, are integrally disposed along one side of the voltage detection wire 40 at a predetermined interval.

Each of the bus bars 32A of the battery wiring modules 30A, 30B electrically connects between the positive electrode terminal 13A and the negative electrode terminal 13B adjacent to each other and is electrically connected to corresponding one of the linear conductors 21 of the voltage detection wire 40 for measuring a voltage of the corresponding battery cell 12.

Figure 3A:
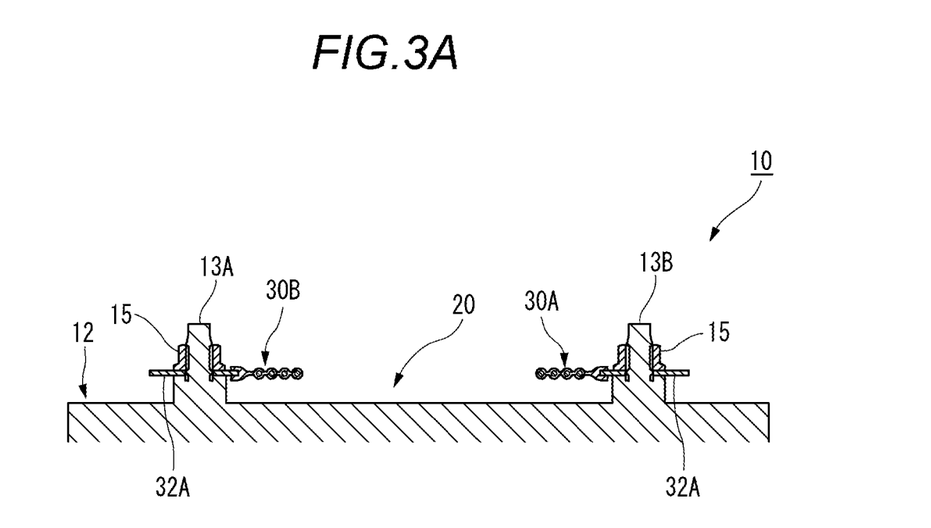
FIG. 3A is a sectional view of a main part of the battery pack taken along line A-A in FIG. 2.
Figure 3B:
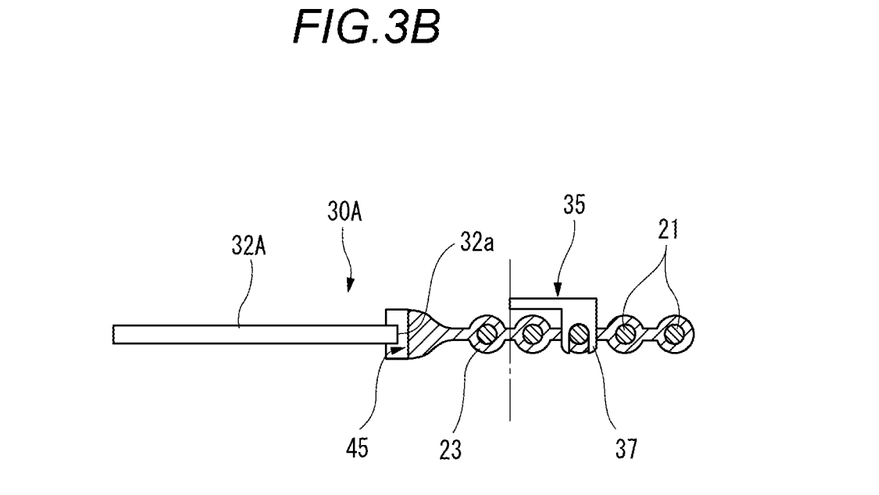
FIG. 3B is a sectional view of the battery wiring module taken along line B-B in FIG. 2.
Figure 4:
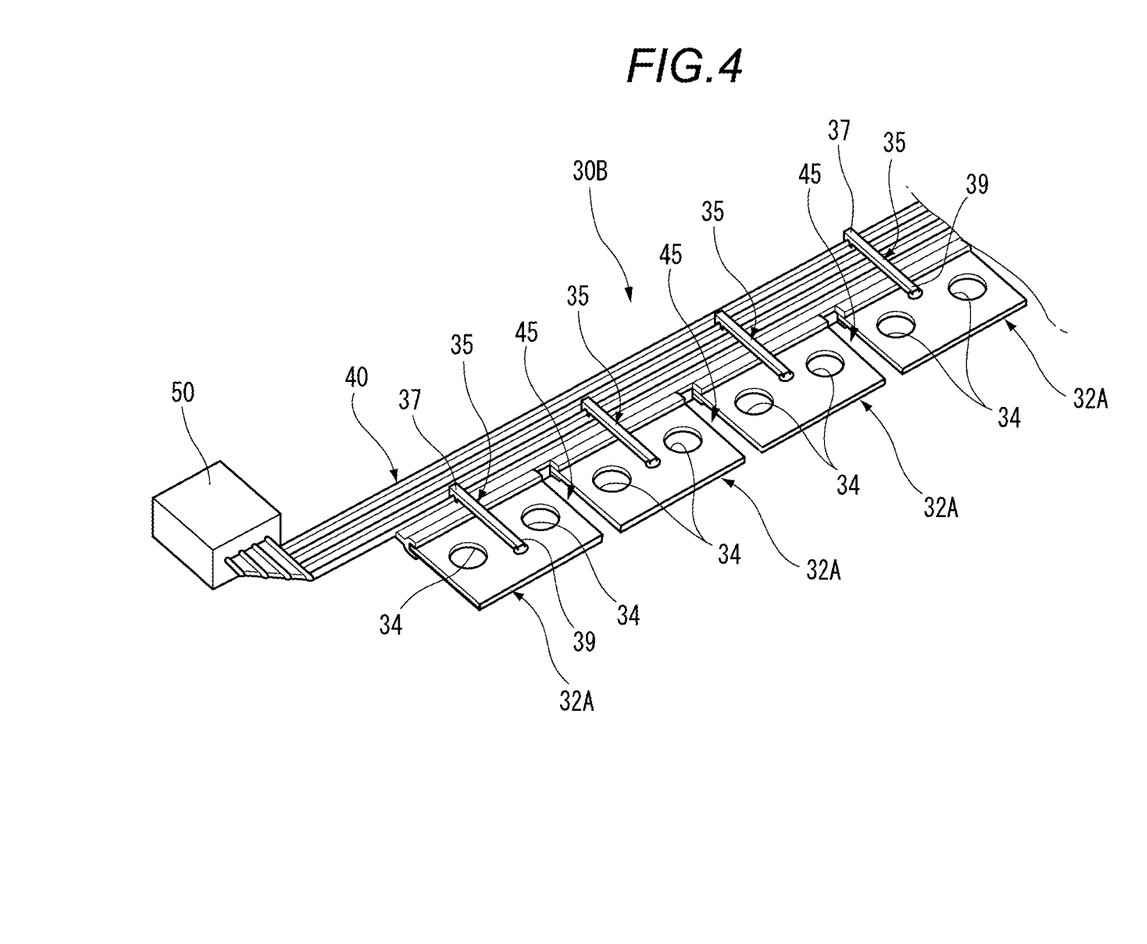
FIG. 4 is a partial plan view of the battery wiring module shown in FIG. 1.

Each of the bus bars 32A according to the embodiment is connected to corresponding one of the linear conductors 21 of the voltage detection wire 40 by means of a connection member 35. The connection member 35 is formed by stamping out a metal plate so as to have a pressure welding blade 37 at one end of a body and a welding part 39 at the other end of the body. Then, as shown in FIG. 3B, the pressure welding blade 37 of the connection member 35 is connected by pressure welding to the predetermined linear conductor 21 and the welding part 39 is connected by welding to the predetermined bus bar 32A (see FIG. 4). Incidentally, the "connection by welding" in this embodiment includes various kinds of known welding connection such as spot welding, ultrasonic welding and laser welding. Further, the connection member according to the invention is not limited to the connection member 35 of this embodiment having the pressure welding blade 37 at the one end but may be various kinds of members such as a wire or a bus bar based on the gist of the invention.

Further, the bus bar 32B of the battery wiring module 30A is electrically connected to the positive electrode terminal 13A or the negative electrode terminal 13B at corresponding one of the both ends, and also electrically connected to the corresponding one of the linear conductors 21 of the voltage detection wire 40 for measuring a voltage of the corresponding battery cell 12.

The bus bar 32B in this embodiment is connected to the corresponding one of the linear conductors 21 of the voltage detection wire 40 via a cut and raised piece 36 formed at a side edge of the bus bar 32B. The cut and raised piece 36 is formed by being bent along the side edge of the bus bar 32B, and a tip of this piece is connected to the predetermined linear conductor 21 by welding (see FIG. 7). The predetermined linear conductor 21, to which the tip is welded, can be selected by suitably changing the bent position of the cut and raised piece 36 to thereby change a protruded position of the tip. Alternatively, in a case of welding an intermediate portion of this piece to the predetermined linear conductor, the predetermined linear conductor 21 can be selected by suitably changing the welding position of this piece without changing the bent position.

Next, a manufacturing method for the battery wiring modules 30A, 30B having the aforesaid configuration will be explained. Incidentally, as each of the battery wiring modules 30A, 30B is fabricated by substantially same fabrication process, the fabrication method will be explained as to the battery wiring module 30B as an example.

The fabrication method of the battery wiring module 30B according to the first embodiment includes an arrangement process (see FIG. 5A) of arranging the long chain bus-bar 33 along and in parallel to the one side of the plurality of linear conductors 21 that are arranged in parallel with the predetermined space; a covering process (see FIG. 5B) of covering both an outer periphery of the plurality of linear conductors 21 and a side edge 33a of the chain bus-bar 33 adjacent to the linear conductors 21 by the insulation resin part 23 integrally formed by the extrusion molding; the breaking process (see FIG. 5C) of breaking the chain parts 46 formed at the predetermined interval along the longitudinal direction of the chain bus-bar 33 to thereby form the plurality of bus bars 32 each for electrically connecting the positive electrode terminal 13A and the negative electrode terminal 13B adjacent to each other; and a connection process (see FIG. 5D) of electrically connecting each of the plurality of linear conductors 21 to the predetermined bus bar 32A by means of the connection member 35.

Firstly, in the arrangement process and the covering process shown in FIGS. 5A and 5B, the insulation resin part 23 is formed by the extrusion molding so as to cover both the outer periphery of the plurality of linear conductors 21 and the side edge 33a of the chain bus-bar 33 adjacent to the linear conductors 21, using a known extruder employing an extrusion molding die having a die opening which can arrange the plurality of linear conductors 21 and the long chain bus-bar 33 in parallel at a predetermined interval therebetween.

That is, both the outer periphery of the plurality of linear conductors 21 and the side edge 33a of the long chain bus-bar 33 are covered by the insulation resin part 23 integrally formed by the extrusion molding. By doing so, a long chain circuit body 60, in which the plurality of linear conductors 21 constituting the voltage detection wire 40 of the flat cable shape and the chain bus-bar 33 are integrally arranged in parallel, is formed (see FIG. 5B).

The chain bus-bar 33 constituting the chain circuit body 60 is formed to be long by connecting the plurality of bus bars 32A via the respective chain parts 46. The chain part 46 is formed in a manner that a width in the longitudinal direction of the chain bus-bar 33 is sufficiently smaller than a width in a direction perpendicular to this longitudinal direction. In the chain bus-bar 33, the terminal through holes 34 for passing the positive electrode terminal 13A and the negative electrode terminal 13B are formed in advance at portions corresponding to each of the bus bars 32A. Further, the chain parts 46 are formed at the side edge 33a adjacent to the linear conductors 21 in the chain bus-bar 33.

Next, in the breaking process shown in FIG. 5C, after the chain circuit body 60 is cut in a desired length along the longitudinal direction, the chain parts 46 formed at the predetermined interval P along the longitudinal direction of the chain bus-bar 33 in the chain circuit body 60 are punched out, and thus the chain bus-bar is divided into a plurality of the bus bars 32A. Each of the chain parts 46 is broken together with a corresponding part of the insulation resin part 23 covering the side edge 33a.

In this case, as the chain part 46 is punched out, the slit 45 is expanded in its length in the longitudinal direction.

Figure 5D:
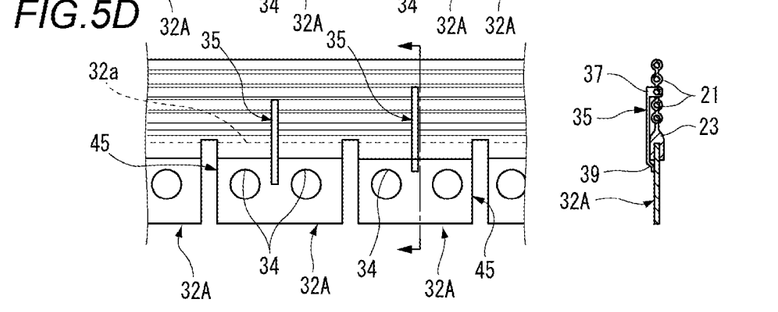
Figure 6:
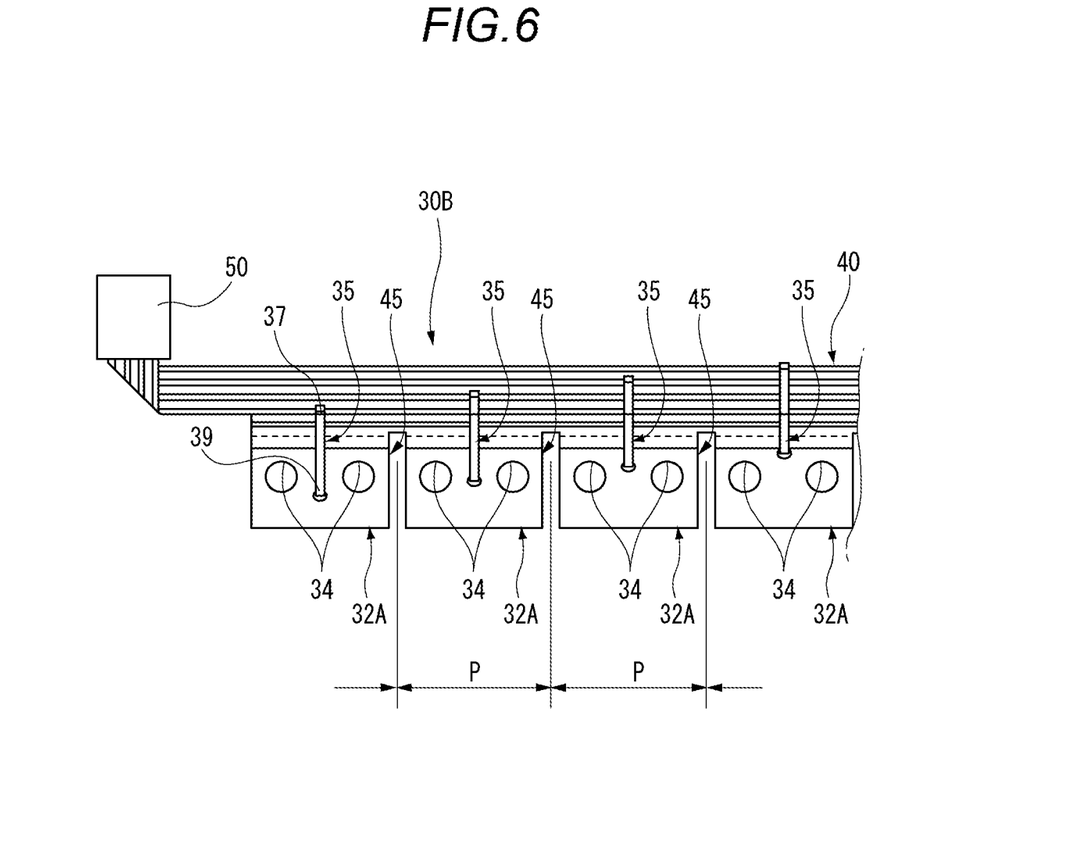
FIG. 6 is a partial plan view of the battery wiring module.

Next, in the connection process shown in FIG. 5D, the plurality of linear conductors 21 are electrically connected to the predetermined bus bars 32A by means of the connection members 35, respectively. In each of the connection members 35, the pressure welding blade 37 formed at the one end of the body is connected to the predetermined linear conductor 21 by pressure-welding, and the welding part 39 formed at the other end of the body is connected by welding to the predetermined bus bar 32A.

Then, the battery wiring module 30B is completed by connecting the connector 50 to the one end of the voltage detection wire 40.

The battery wiring modules 30A, 30B configured in this manner are mounted on an upper surface of the battery module 20 in which the twelve battery cells 12 are arranged in the side-by-side manner so that the positive electrode terminal 13A and the negative electrode terminal 13B having the opposite polarities are adjoined between the adjacent battery cells 12, 12.

Next, as shown in FIG. 7, all the positive electrode terminals 13A and the negative electrode terminals 13B of the plurality of battery cells 12 arranged in the side-by-side manner are passed through all the terminal through holes 34 of the bus bars 32A, 32B. Further, the partition parts 24 of the separators 22 are inserted into the respective slits 45.

Then, the respective nuts 15 are screwed and fastened on the positive electrode terminals 13A and the negative electrode terminals 13B protruded from the terminal through holes 34. When all the positive electrode terminals 13A and the negative electrode terminals 13B are fastened by the respective nuts 15, the battery pack 10 in which the battery wiring modules 30A and 30B are mounted on the battery module 20 is completed.

According to the fabrication method of the battery wiring modules 30A, 30B according to the first embodiment, in the covering process, both the outer periphery of the plurality of linear conductors 21 and the side edge 33a of the long chain bus-bar 33 are covered by the insulation resin part 23 integrally formed by the extrusion molding. Thus, the long chain circuit body 60, in which the plurality of linear conductors 21 and the chain bus-bar 33 are integrally arranged in parallel, is formed. As this chain circuit body 60 is continuously formed by the extrusion molding using the not-shown known extruder, a manufacturing cost can be reduced easily.

Further, in the breaking process, the chain parts 46 of the chain bus-bar 33 in the chain circuit body 60 are broken. By doing so, the plurality of bus bars 32A, 32B connected via the insulation resin part 23 are integrally arranged along the plurality of linear conductors 21.

As the plurality of bus bars 32A, 32B are integrally arranged via the insulation resin part 23 along the linear conductors 21, mounting workability at the time of assembling the battery wiring modules 30A and 30B with the battery module 20 can be prevented from being degraded. Of course, it is not necessary to separately prepare a member for arranging the plurality of bus bars 32A, 32B on the battery module 20.

Further, according to the fabrication method of the battery wiring module 30B according to the first embodiment, in the connection process, the tip of the cut and raised piece 36 formed by being bent at the side edge of the bus bar 32B is connected to the predetermined linear conductor 21 of the voltage detection wire 40 by welding.

In this manner, the bus bar 32B can be electrically connected to the predetermined linear conductor 21 by the simple work of welding the tip of the cut and raised piece 36 formed at the bus bar 32B to the predetermined linear conductor 21.

Further, according to the fabrication method of the battery wiring module 30B according to the first embodiment, in the connection process, the pressure welding blade 37 formed at the one end of the connection member 35 is connected by the pressure welding to the predetermined one of the plurality of linear conductors 21 covered by the insulation resin part 23. Further, the welding part 39 formed at the other end of the connection member is connected by the welding to the predetermined bus bar 32A.

In this manner, the predetermined linear conductor 21 and the bus bar 32A can be electrically connected by the simple works of connecting by the pressure welding the pressure welding blade 37 formed at the one end of the connection member 35 to the predetermined linear conductor 21 and also connecting by the welding the welding part 39 formed at the other end of the connection member 35 to the bus bar 32A.

In the fabrication method of the battery wiring module 30B according to the first embodiment, various kinds of the chain bus-bars 33, in which the bus bars are connected by the chain parts 46 at different intervals depending on the respective intervals between the positive electrode terminal 13A and the negative electrode terminal 13B, can be prepared. In the covering process, the desired chain bus-bar 33 can be selectively used among these various kinds of the chain bus-bars. By doing so, as the bus bars 32A which interval is suitably changed depending on a size, etc. of the battery cell 12 can be easily formed, the battery wiring module 30B with a quite-high versatility can be obtained.

Figure 8A:
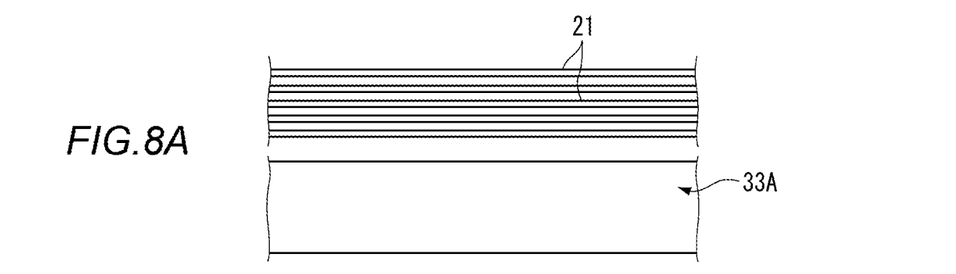
FIGS. 8A to 8C are plan views of a main part of a battery wiring module using a long plate-shaped conductor, for explaining a fabrication process of the battery wiring module according to a comparative example.
Figure 8B:
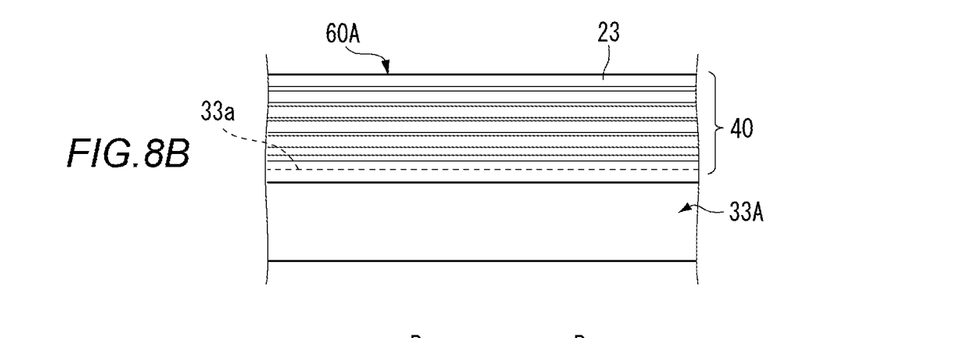
Figure 8C:
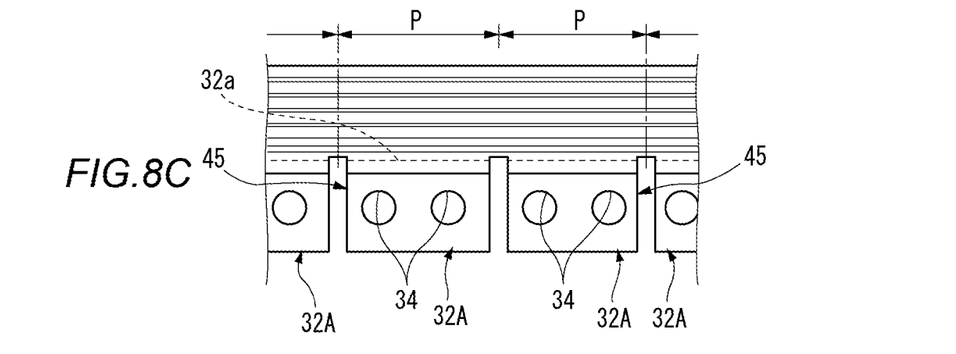

FIGS. 8A to 8C are plan views of a main portion of a battery wiring module using a long plate-shaped conductor, for plaining a fabrication method of this battery wiring module according to a comparative example.

The fabrication method of a battery wiring module according to the comparative example includes an arrangement process (see FIG. 8A) of arranging a long flat-shaped conductor 33A along and in parallel to one side of a plurality of linear conductors 21 that are arranged in parallel with a predetermined space; a covering process (see FIG. 8B) of covering both an outer periphery of the plurality of linear conductors 21 and a side edge 33a of the flat-shaped conductor 33A adjacent to the linear conductors 21 by an insulation resin part 23 integrally formed by extrusion molding; and a pressing process (see FIG. 8C) of punching out a plurality of slits 45 at a predetermined interval and also punching out terminal through holes 34 along the longitudinal direction of the flat-shaped conductor 33A to thereby form a plurality of bus bars 32A each for electrically connecting a positive electrode terminal 13A and a negative electrode terminal 13B adjacent to each other.

Figure 9A:
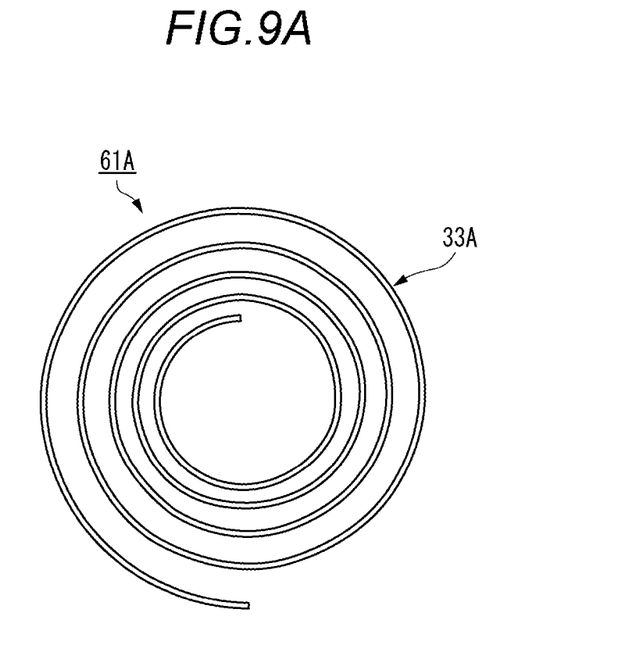
FIG. 9A is a schematic side view, seen from a direction along an axial line of a wound body, of the wound body obtained by winding a flat circuit body using a plate-shaped conductor shown in FIG. 8B.

According to the fabrication method of the battery wiring module according to the comparative example, the flat-shaped conductor 33A of a flat circuit body 60A shown in FIG. 8B, formed by integrally molding the linear conductors 21 and the flat-shaped conductor 33A, is unlikely bent in a succeeding winding process. Thus, as shown in FIG. 9A, a wound diameter of a wound flat circuit body 61A obtained by winding the flat circuit body 60A becomes large, and hence degradation of productivity is concerned.

Figure 9B:
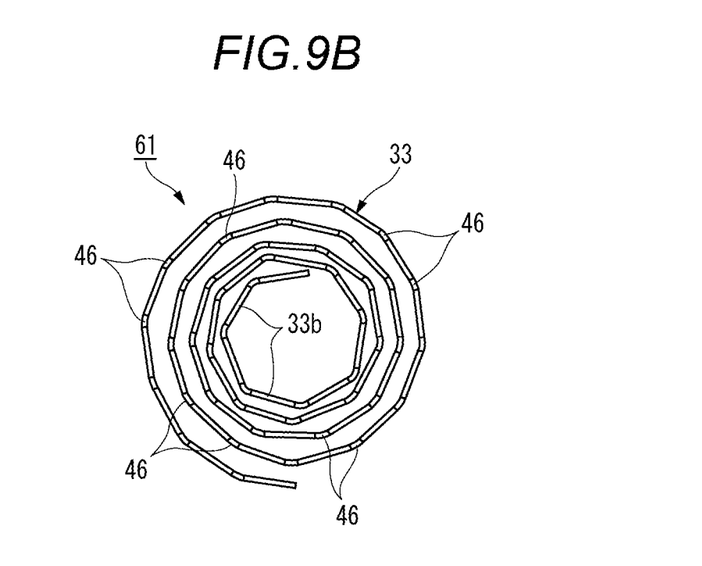
FIG. 9B is a schematic side view, seen from a direction along an axial line of a wound body, of the wound body obtained by winding a chain circuit body using a chain bus bar shown in FIG. 5B.

On the contrary, in the long chain bus-bar 33 according to the first embodiment, the chain parts 46, each having the width in the longitudinal direction of the chain bus-bar 33 sufficiently smaller than the width in the direction perpendicular to this longitudinal direction, are formed at the predetermined interval P. By doing so, when the chain circuit body 60 after the covering process is wound around a winding center in the direction perpendicular to the longitudinal direction, the chain part 46 having a small sectional area of the chain bus-bar 33 deforms easily. Thus, the chain circuit body can be wound around a not-shown winding reel or the like as a wound member having a small diameter, as shown in FIG. 9B. As a result, the chain circuit body 60 after the covering process can be wound to have a diameter smaller than that of the wound flat circuit body 61A (see FIG. 9A). Accordingly, a wound chain circuit body 61 shown in FIG. 9B obtained by winding the chain circuit body 60 can be facilitated in its transportation and treatment and improved in its productivity.

Incidentally, the wound chain circuit body 61 is wound around the winding reel spirally within a range not remaining permanent distortion in the bus bars 32A. However, permanent distortion may be caused in the chain parts 46. As the chain parts 46 are removed in the breaking process, even if distortion is caused in the chain parts, such the distortion does not influence on reliability of contact with the positive electrode terminals 13A or the negative electrode terminals 13B.

Further, in the fabrication method of the battery wiring module 30B according to the first embodiment, the terminal through holes 34 are formed in advance at the chain bus-bar 33 in the covering process. The bus bar 32A has a reduced sectional area at a portion provided with the terminal through hole 34. The bus bar 32A having the terminal through hole 34 is lower in its rigidity as compared with the bus bar having no terminal through hole 34. The chain bus-bar 33 likely deforms elastically due to the reduction of rigidity at the terminal through hole portion in addition to the flexibility due to the chain part 46. Thus, the chain circuit body 60 after the covering process, provided with the chain bus-bar 33 having the terminal through holes 34, can be wound with a smaller diameter.

Further, in a case of using the chain bus-bar 33 in which the terminal through holes 34 are formed in advance, the breaking process can be completed only by cutting the chain parts 46. Accordingly, as a processing of forming the terminal through holes 34 in the breaking process can be eliminated, a cost of a post processing can be reduced.

Further, in the fabrication method of the battery wiring module 30B according to the first embodiment, the chain parts 46 are formed at the side edge 33a of the chain bus-bar 33. The chain parts 46 arranged at the side edge 33a are covered by the insulation resin part 23 in the covering process. The chain parts 46 are broken together with the insulation resin part 23 in the breaking process. Thus the bus bar 32A does not have any remarkable cut mark (burr or the like) of the chain parts 46 at a contour thereof in a plan view. As a result, appearance of the bus bar 32A can be improved.

Next, a manufacturing method for a battery wiring module 80 according to a second embodiment will be explained.

Incidentally, in the explanation of the second embodiment, portions substantially identical to those of the battery wiring module 30B according to the first embodiment are referred to by the common symbols, with overlapped explanation thereof being omitted.

Figure 10A:
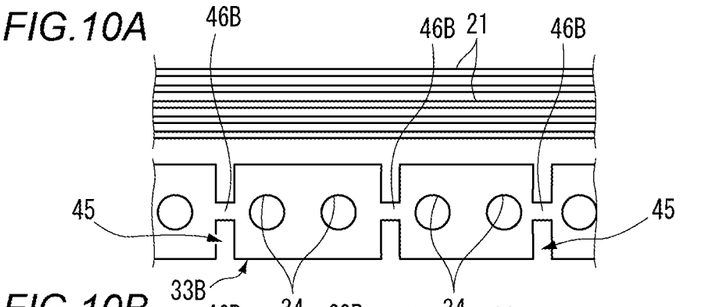
FIGS. 10A to 10C are plan views of a main part of a battery wiring module, for explaining a fabrication process of the battery wiring module according to a second embodiment.
Figure 10B:
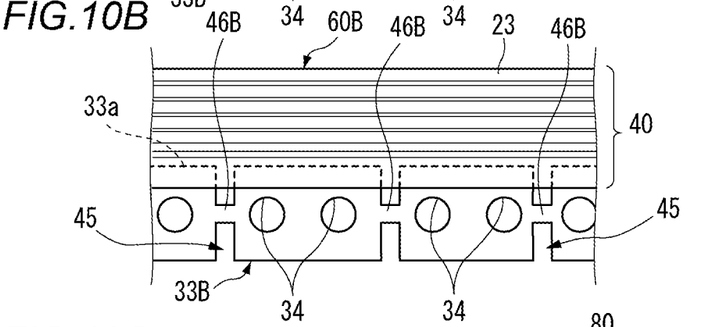

In an arrangement process and a covering process in the fabrication method of the battery wiring module 80 according to the second embodiment, as shown in FIGS. 10A and 10B, an insulation resin part 23 is formed by extrusion molding so as to cover both an outer periphery of a plurality of linear conductors 21 and a side edge 33a of a long chain bus-bar 33B adjacent to the linear conductors 21, using a known extruder employing an extrusion molding die having a die opening which can arrange the plurality of linear conductors 21 and a long chain bus-bar 33B in parallel at a predetermined interval therebetween.

That is, both the outer periphery of the plurality of linear conductors 21 and the side edge 33a of the long chain bus-bar 33B are covered by the insulation resin part 23 integrally formed by the extrusion molding. By doing so, a long chain circuit body 60B, in which the plurality of linear conductors 21 constituting a voltage detection wire 40 of a flat cable shape and the chain bus-bar 33B are integrally arranged in parallel, is formed.

The chain bus-bar 33B constituting the chain circuit body 60B is formed to be long by connecting the plurality of bus bars 32A via respective chain parts 46B. The chain part 46B is formed in a manner that a width in the longitudinal direction of the chain bus-bar 33B is sufficiently smaller than a width in a direction perpendicular to this longitudinal direction. Further, the chain part 46B is formed at a center position of the chain bus-bar 33B in the direction perpendicular to the longitudinal direction.

Figure 10C:
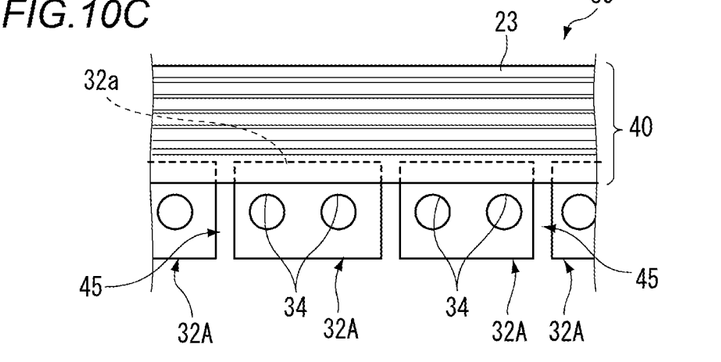

That is, in the fabrication method of the battery wiring module 80 according to the second embodiment, the chain parts 46B are not covered by the insulation resin part 23 in the covering process. In the breaking process, only the chain parts 46B of the chain circuit body 60B are broken but the insulation resin part 23 is not broken. Thus, as notch loss does not occur in the insulation resin part 23, durability of the insulation resin part 23 can be improved. Further, in the chain bus-bar 33B arranging the chain parts 46B at the center position thereof, as the chain parts 46B are not covered by the insulation resin part 23, presence/non-presence of the chain parts 46B after the breaking process can be visually recognized easily.

Next, a manufacturing method for a battery wiring module 90 according to a third embodiment will be explained.

Incidentally, in the explanation of the third embodiment, portions substantially identical to those of the battery wiring module 30B according to the first embodiment are referred to by the common symbols, with overlapped explanation thereof being omitted.

In the battery wiring module 90 according to the third embodiment, like the battery wiring module 30B according to the first embodiment, a long chain circuit body 60 is formed in an arrangement process and a covering process (see FIG. 5B).

Figure 11A:
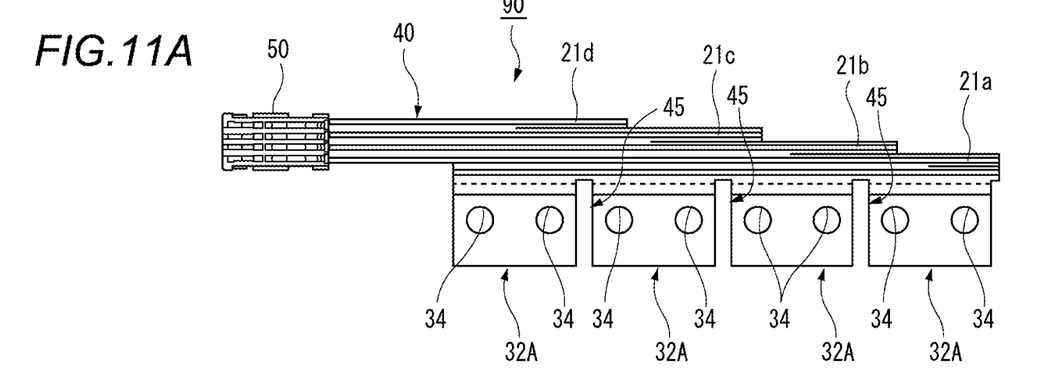
FIGS. 11A and 11B are plan views of a battery wiring module according to a third embodiment.

Then, the chain circuit body 60 is cut in a desired length along the longitudinal direction. Thereafter, at a time of breaking chain parts 46 of a chain bus-bar 33 in the chain circuit body 60, as shown in FIG. 11A, a part of a voltage detection wire 40 is punched out and also the chain bus-bar 33 is punched out while leaving four bus bars 32A.

Respective end parts 21a, 21b, 21c and 21d as one ends of a plurality of linear conductors 21 of the voltage detection wire 40 arranged in parallel to the four bus bars 32A are formed in a staircase pattern rising to the left side from the right side. That is, the end part 21a of the linear conductor 21 on the nearest side has the longest size, whilst the end part 21d of the linear conductor 21 on the most rear side has the shortest size.

Figure 11B:
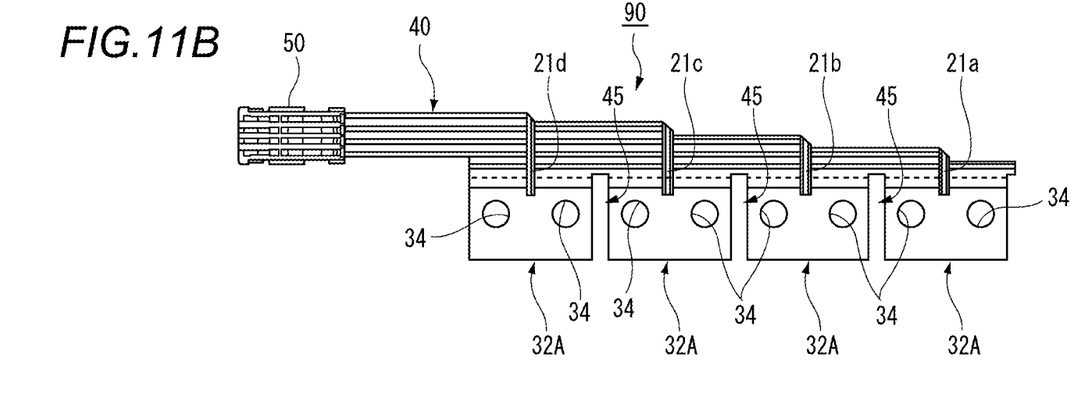

Next, as shown in FIG. 11B, in a connection process, the end parts 21a, 21b, 21c and 21d of the plurality of linear conductors 21 covered by an insulation resin part 23 are separated from one another in a manner of separating the linear conductors 21 from one another while remaining the other ends thereof. Then, each of the end parts 21a, 21b, 21c and 21d is bent substantially orthogonally toward corresponding one of the four bus bars 32A and connected to the corresponding bus bar 32A by welding.

Thereafter, the battery wiring module 90 is completed by connecting a connector 50 to one end of the voltage detection wire 40.

In this manner, according to the fabrication method of the battery wiring module 90 according to the third embodiment, the bus bar 32A can be electrically connected to the predetermined linear conductor 21 by the simple work of separating the insulation resin part 23 among the respective linear conductors 21 and then welding the end parts 21a, 21b, 21c and 21d of the linear conductors 21 to the respective bus bars 32A.

Thus, according to the fabrication method of the battery wiring modules 30A, 30B, 80 and 90 according to the respective embodiments, wiring to the respective battery cells 12 can be performed easily with the simple configuration, and also versatility can be improved and a manufacturing cost can be reduced Herein the features of the manufacturing method for the battery wiring module according to the embodiments will be briefly summarized and listed below

[1] The manufacturing method for the battery wiring module (30A, 30B) to be combined with a battery module (20) including a plurality of battery cells (12) laminated in a state of being alternatively reversed so that a positive electrode terminal (13A) and a negative electrode terminal (13B) are adjoined between the adjacent battery cells, the manufacturing method comprising:
arranging a long chain bus-bar (33) in parallel with a plurality of linear conductors along to at least one side of the plurality of linear conductors, wherein the long chain bus-bar is configured by connecting a plurality of bus bars (32A, 32B) at chain parts (46), and wherein the plurality of linear conductors (21) are arranged in parallel at a predetermined interval;
covering both an outer periphery of the plurality of linear conductors (21) and a side edge (33a) of the chain bus-bar adjacent to the plurality of linear conductors (21) with an insulation resin part (23) integrally formed by extrusion molding;
after the covering, breaking the chain parts (46) of the chain bus-bar (33) in order to separate the plurality of bus bars in which each of the bus bars is for electrically connecting the positive electrode terminal (13A) and the negative electrode terminal (13B) adjacent to each other; and
electrically connecting each of the plurality of linear conductors (21) to a predetermined one of the bus bars (32A, 32B).

[2] The manufacturing method for the battery wiring module (30A, 30B) according to [1], wherein the chain bus-bar (33) the side edge of which is covered with the insulation resin part in the covering process has terminal through holes (34) for inserting the positive electrode terminals (13A) or the negative electrode terminals (13B).

[3] The manufacturing method for the battery wiring module (30A, 30B) according to [1] or [2], wherein the chain parts (46) are formed at the side edge (33a) of the chain bus-bar (33).

[4] The manufacturing method for the battery wiring module (80) according to [1] or [2], wherein each of the chain parts (46B) is formed at a center position of the chain bus-bar (33B) in a direction perpendicular to a longitudinal direction of the chain bus-bar.

Incidentally, the invention is not limited to the aforesaid embodiments but suitable changes, improvements, and so on may be performed. The material, shapes, sizes, numbers, arrangement positions, etc. of the respective constituent elements in the aforesaid embodiments may be optional ones and not limited to particular ones so long as the invention is achieved.

DESCRIPTION OF THE REFERENCE NUMERALS AND SIGNS 12 battery cell
13A positive electrode terminal
13B negative electrode terminal
20 battery module
21 linear conductor
23 insulation resin part
30A, 30B battery wiring module
32A, 32B bus bar
33 chain bus-bar
33a side edge
34 terminal through hole
46 chain part

What is claimed is:

1. A manufacturing method for a battery wiring module to be combined with a battery module including a plurality of battery cells stacked in a state of being alternatively reversed so that a positive electrode terminal and a negative electrode terminal are adjoined between adjacent battery cells, the manufacturing method comprising:
arranging a long chain bus-bar in parallel with a plurality of linear conductors along to at least one side of the plurality of linear conductors, wherein the long chain bus-bar is configured by connecting a plurality of bus bars at chain parts, and wherein the plurality of linear conductors are arranged in parallel at a predetermined interval;
covering both an outer periphery of the plurality of linear conductors and a side edge of the chain bus-bar adjacent to the plurality of linear conductors with an insulation resin part integrally formed by extrusion molding;
after the covering, breaking the chain parts of the chain bus-bar in order to separate the plurality of bus bars in which each of the bus bars is for electrically connecting the positive electrode terminal and the negative electrode terminal adjacent to each other; and
electrically connecting each of the plurality of linear conductors to a predetermined one of the bus bars.

2. The manufacturing method for the battery wiring module according to claim 1, wherein the chain bus-bar the side edge of which is covered with the insulation resin part in the covering process has terminal through holes for inserting the positive electrode terminals or the negative electrode terminals.

3. The manufacturing method for the battery wiring module according to claim 1, wherein the chain parts are formed at the side edge of the chain bus-bar.

4. The manufacturing method for the battery wiring module according to claim 2, wherein the chain parts are formed at the side edge of the chain bus-bar.

5. The manufacturing method for the battery wiring module according to claim 1, wherein each of the chain parts is formed at a center position of the chain bus-bar in a direction perpendicular to a longitudinal direction of the chain bus-bar.

6. The manufacturing method for the battery wiring module according to claim 2, wherein each of the chain parts is formed at a center position of the chain bus-bar in a direction perpendicular to a longitudinal direction of the chain bus-bar.

* * * * *